Feb. 1, 1966 R. H. HURT 3,232,265
HEIGHT CLEARANCE INDICATOR
Filed June 15, 1964 2 Sheets-Sheet 1

Robert H. Hurt
INVENTOR.

BY *Clarence A. O'Brien*
and *Harvey B. Jackson*
Attorneys

Feb. 1, 1966 R. H. HURT 3,232,265
HEIGHT CLEARANCE INDICATOR
Filed June 15, 1964 2 Sheets-Sheet 2
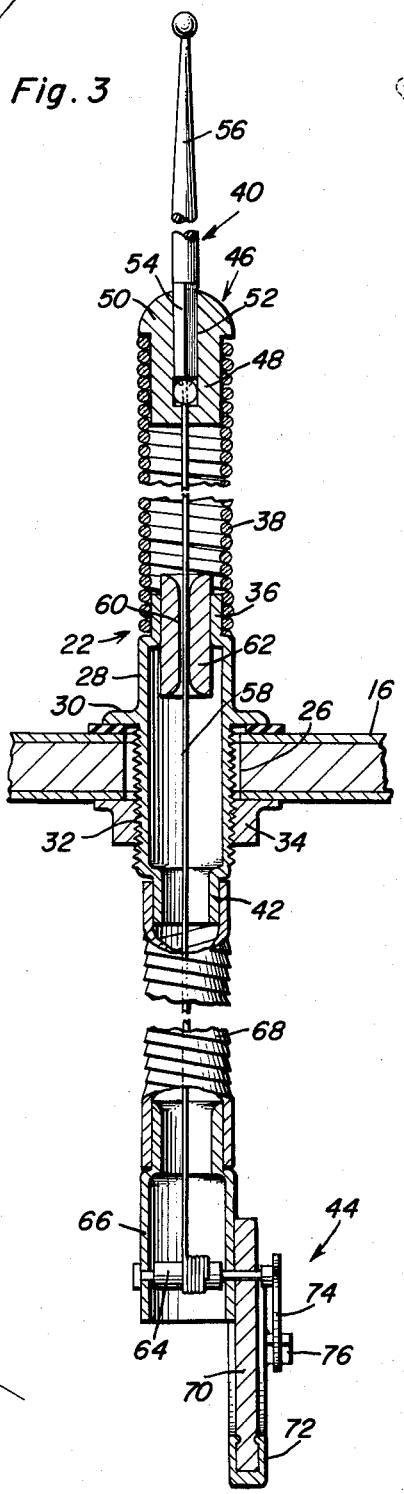
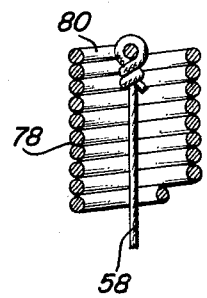
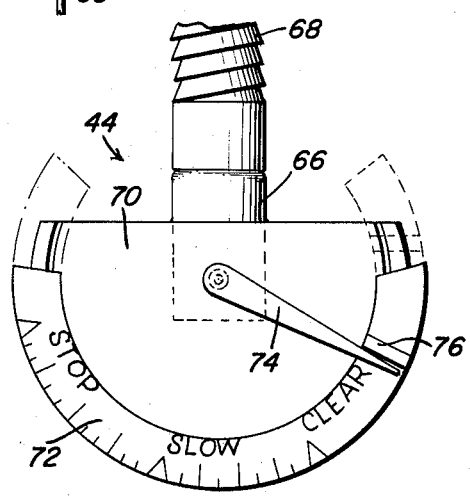
Robert H. Hurt
INVENTOR.

United States Patent Office 3,232,265
Patented Feb. 1, 1966

3,232,265
HEIGHT CLEARANCE INDICATOR
Robert H. Hurt, 421 N. State St., Kent, Wash.
Filed June 15, 1964, Ser. No. 375,280
11 Claims. (Cl. 116—28)

This invention relates to improvements in indicator decives adapted to be mounted on motor vehicle trailer trucks so as to provide an automatic warning of overhead obstructions, this type of indicator device being disclosed and claimed in my prior copending application U.S. Ser. No. 201,087, filed June 8, 1962, now Patent No. 3,137,267. The present application is therefore a continuation in part of the aforesaid prior copending application.

As pointed out in the aforementioned prior copending application, considerable damage to the roof portion of trailer bodies often results from miscalculation of the actual height of the trailer body and the clearance of an overhead obstruction. Because of variations in the trailer body load, the relationship of the trailer body to a particular towing cab to which it is hitched and other such factors, the truck operator is often unaware of the actual height of the trailer body under moving conditions at any particular instance. Accordingly, even when clearance of the overhead obstruction is posted by a sign, a vehicle operator my unwittingly proceed without caution causing considerable damage to the roof portion of the trailer body. It is therefore a primary object of the present invention to provide an improved attachment device adapted to be mounted on top of a cab of a trailer truck for providing an automatic warning to the vehicle operator of the actual proximity of a trailer body roof to the overhead obstruction so that the vehicle may be stopped before any damage occurs.

Another object in accordance with the foregoing object is to provide a clearance height indicator which is readily mounted through an opening formed in the roof of the truck cab.

A further object of the present invention is to provide a clearance height indicator constructed of a minimum of replaceable parts yet capable of warning the operator as to the proximity of the overhead obstruction. It will be appreciated, that where the difference between the height of the trailer body and the overhead clearance is relatively small, caution must be exercised because of vibratory movement of the trailer body in a vertical direction as well as variation in the clearance height of the over-head obstruction. When travelling at a high rate of speed, the road conditions may be such as to produce vibrations of large enough amplitudes to damage the trailer roof, should the clearance be small. The indicator of the present invention will therefore provide a warning of this condition in addition to indicating the impossibility of passage below the overhead obstruction. The height clearance indicator of the present invention therefore is also useful in connection with indicating a safe speed at which the vehicle may pass under the overhead obstruction.

An additional object of the present invention is to provide a height indicator construction capable of being assembled from readily available parts and also adjustable in accordance with the different requirements of vehicle operators.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged partial sectional view taken substantially through a plane indicated by section line 3—3 in FIGURE 2.

FIGURE 4 is a partial front elevational view showing the position indicator.

FIGURE 5 is a partial perspective view showing a modified form of position height indicator.

FIGURE 6 is a partial sectional view taken substantially thorugh a plane indicated by section line 6—6 in FIGURE 5.

Figure 1:
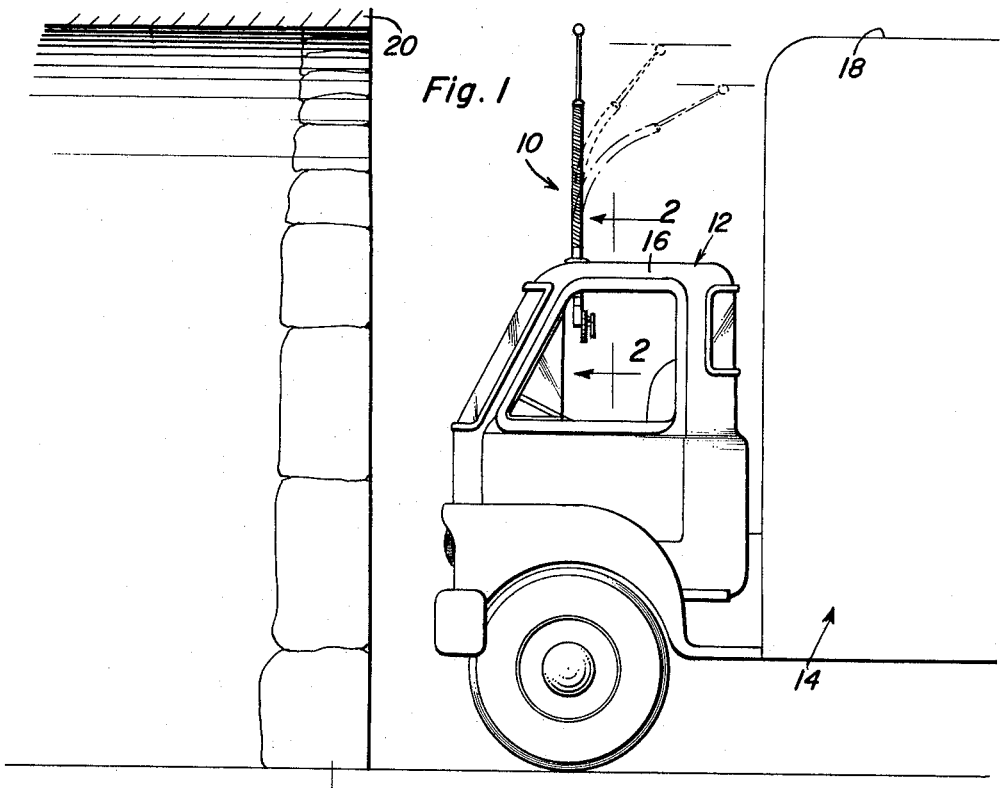
FIGURE 1 is a side elevational view of a portion of a trailer truck just prior to entry beneath an overhead obstruction with the clearance height indicator installed on the truck vehicle in accordance with the principles of the present invention.

Referring now to the drawings in detail, it will be observed in FIGURE 1 that the clearance height indicator generally referred to by reference numeral 10 is mounted on top of the trailer truck cab generally referred to by the reference numeral 12 to which a trailer truck body 14 is hitched in the usual manner and in rearwardly disposed relationship to the cab. It will therefore be apparent, that the clearance height indicator 10 shown extending through the roof portion 16 of the cab 12 projects upwardly thereabove a predetermined distance above the roof portion 18 of the trailer body 14 and is also disposed a substantial distance forward of the trailer body so that it may provide a clearance indication before any possible impact may occur between an overhead obstruction 20 and the roof portion 18 of the trailer body. It will also be apparent that the height clearance indicator projects downwardly through the roof portion 16 into the cab so that it may be viewed by the vehicle operator.

Figure 2:
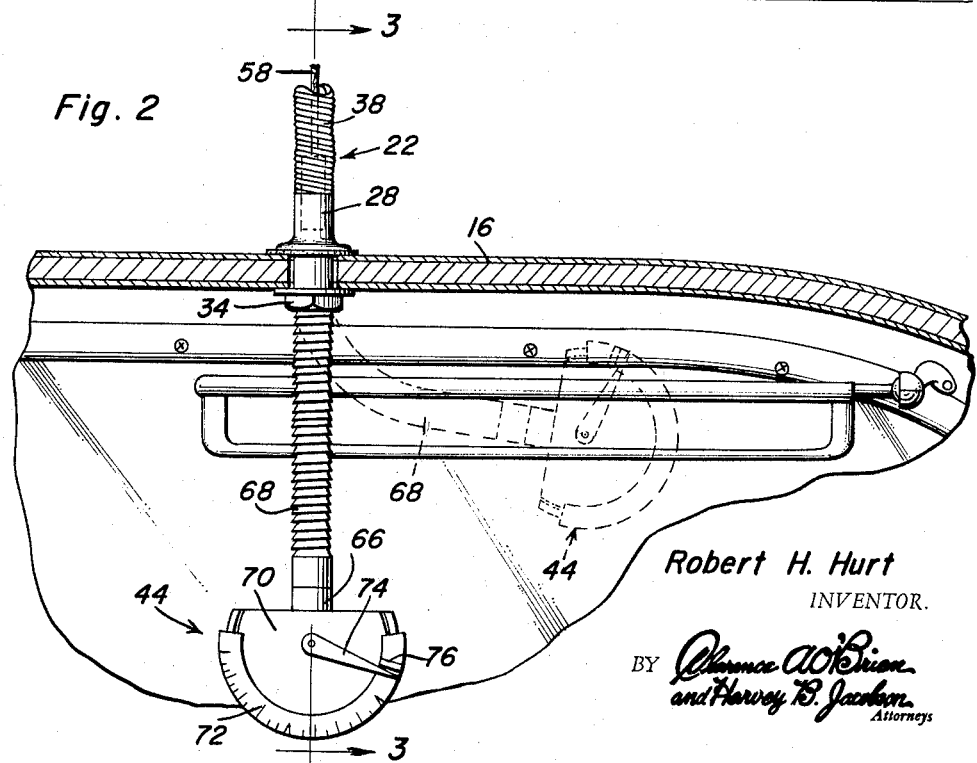
FIGURE 2 is an enlarged partial sectional view taken substantially through a plane indicated by section line 2—2 in FIGURE 1.

Referring now to FIGURES 2 and 3 in particular, it will be observed that the clearance height indicator includes a tubular assembly generally referred to by reference numeral 22 elongated in a vertical direction for mounting through a suitable opening 26 formed in the roof portion 16 of the cab. The tubular assembly includes a rigid tubular member 28 provided with an annular flange portion 30 which is seated on top of the roof 16 of the cab and an externally threaded portion 32 which projects through the opening 26 into the cab. A mounting nut 34 is therefore threadedly mounted on the externally threaded portion 32 so as to lock the rigid tubular member 28 in position. The tubular member is provided at its upper end with a necked down portion 36 over which the lower end of a coil spring 38 is positioned with a force fit. The coil spring therefore projects upwardly from the upper end of the rigid tubular member 28 and is elastically deflectable relative thereto. The upper end of the coil spring mounts a feeler assembly generally referred to by reference numeral 40. The lower end of the rigid tubular member is also provided with a necked down portion 42 by means of which a position indicator generally referred to by reference numeral 44 is mounted within the cab.

The feeler assembly 40 includes an anchor member 46 having a shank portion 48 received within the upper portion of the coil spring 38 and an enlarged end portion 50 which is seated on the upper end of the coil spring. A non-circular bore 52 is formed within the anchor member 46 so as to non-rotatively receive the lower end portion 54 of the feeler rod 56. Accordingly, the feeler rod projects upwardly and is yieldably held in a vertical position by the coil spring 38 so that when the feeler rod 56 engages an overhead obstruction, the coil spring 38 will be laterally deflected as shown by dotted line in FIGURE 1.

The anchor member 46 has secured thereto one end of a mechanical actuating cable 58. The cable extends downwardly from the anchor member through the coil spring 38 and is received through a bore 60 coaxially positioned relative to the rigid tubular member 28 by the guide member 62 assembled within the upper end portion 36 of the rigid tubular member. Accordingly, although the cable 58 is laterally deflected with the coil spring above the guide member 62, it will be held in coaxial relationship to the tubular member below the guide member 62. It will also be apparent, that lateral deflection of the coil spring 38 in response to engagement of the feeler rod with an overhead obstruction, will produce upward displacement of the cable 58.

The lower end of the cable 58 is therefore anchored to a winding shaft 64 rotatably mounted by the tubular element 66 of the position indicator 44. With continued reference to FIGURES 2, 3 and FIGURE 4, it will be observed that the tubular element 66 is operatively mounted on the lower end portion 42 of the rigid tubular member 28 by means of the flexible tubing 68 so that the position indicator may be adjustably disposed in any desired position such as shown by dotted line in FIGURE 2. Secured to the tubular element 66 is a scale mounting member 70. An arcuate scale member 72 may be adjustably positioned on the scale mounting member 70 so as to cooperate with a scale pointer element 74 secured to the winding shaft 64 for rotation therewith. The scale member may therefore be provided with a limit stop 76 for the pointer. When the feeler assembly is in its vertical position, for any particular adjusted position of the position indicator 44, the scale member 72 may be adjustably positioned so that the limit stop 76 abuts the pointer 74. Deflection of the coil spring 38 by engagement of the feeler rod with an obstruction will therefore cause upward displacement of the cable 58 causing angular displacement of the winding shaft 64 and the pointer 74 by an amount corresponding to the amount of the coil spring deflection so as to provide an indication of the obstruction proximity to the roof 18 of the trailer body. Accordingly, the scale member 72 is provided with suitable indicia as described in the aforementioned prior copending application.

Referring now to FIGURES 5 and 6, a modified form of height clearance indicator is shown wherein the coil spring 38 may be replaced by a coil spring 78. The upper end coil 80 of the coil spring 78 is formed integral with an axially extending feeler rod 82 so that engagement of the feeler rod 82 with an overhead obstruction will directly cause lateral deflection of the coil spring 78 as shown by dotted line in FIGURE 5. Deflection of the coil spring will accordingly upwardly displace the cable 58 which is secured in any suitable manner to the end coil 80. Operation of the height indicator associated with the modification illustrated in FIGURES 5 and 6 is otherwise the same as described with respect to FIGURES 1 through 4.

From the foregoing description, the operation, construction and utility of the clearance height indicator of the present invention will be apparent. It will therefore be appreciated, that installation of the indicator device will be a simple matter involving only the mounting of the rigid tubular member 28 through the opening 26 in the roof of the vehicle cab. The feeler assembly may then be assembled thereon above the roof of the cab. The cable 58 will then extend into the cab and be connected to the position indicator assembly 44. The position indicator may also be mounted on the rigid tubular member at the lower end thereof within the cab that it may be adjustably positioned by means of the flexible tubing 68. For any adjusted position of the position indicator assembly 44, adjustment may be made so that the pointer 74 may accurately reflect the condition of the coil spring mounting for the feeler assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A clearance indicator for a trailer cab hitched to a trailer having a roof substantially higher than said cab comprising, a rigid tubular member mounted by said cab and having opposite ends respectively disposed above and within the cab, a laterally deflectable coil spring mounted on the end of the rigid tubular member above the cab, feeler means secured to an upper end of said coil spring for displacement from a predetermined position projecting above the roof of a trailer, position indicating means operatively mounted by the end of the rigid tubular member within the cab for viewing purposes, cable means extending through the coil spring and the tubular member for mechanically interconnecting the feeler means with the position indicator means to indicate proximity of the trailer roof to an overhead obstruction in response to displacement of the feeler means against the bias of the coil spring.

2. The combination of claim 1 inluding a rigid guide member secured to the end of the tubular member above the cab, said guide member having a bore coaxial with the tubular member through which the cable means extends to prevent lateral deflection thereof within the tubular member.

3. The combination of claim 2 including flexible tubing operatively mounting the position indicator means on the end of the tubular member within the cab for adjustable positioning thereof.

4. The combination of claim 3 wherein said feeler means comprises, an anchor member seated on the upper end of said coil spring to which the cable means is secured, and a rigid feeler rod fixedly mounted by the anchor member projecting upwardly therefrom.

5. The combination of claim 1 wherein said feeler means comprises, an anchor member seated on the upper end of said coil spring to which the cable means is secured, and a rigid feeler rod fixedly mounted by the anchor member projecting upwardly therefrom.

6. The combination of claim 5 including a rigid guide member secured to the end of the tubular member above the cab, said guide member having a bore coaxial with the tubular member through which the cable means extends to prevent lateral deflection thereof within the tubular member.

7. The combination of claim 1 wherein said feeler means comprises an elongated rod integrally connected to the upper end of the coil spring and projecting axially therefrom.

8. The combination of claim 7 including a rigid guide member secured to the end of the tubular member above the cab, said guide member having a bore coaxial with the tubular member through which the cable means extends to prevent lateral deflection thereof within the tubular member.

9. The combination of claim 1 including flexible tubing operatively mounting the position indicator means on the end of the tubular member within the cab for adjustable positioning thereof.

10. A clearance indicator for a trailer cab hitched to a trailer having a roof substantially higher than said cab comprising, tubular means mounted by said cab having an upper end disposed above the cab and a lower end viewed from within the cab, a feeler mounted on said tubular means for displacement from a predetermined position projecting above the roof of the trailer, position indicating means operatively mounted on said lower end of the tubular means for viewing from within the cab, said tubular means including an elastically deflectable portion yieldably holding said feeler in said predetermined position, and mechanical means extending through said tubular means for instantaneously actuating said position indicating means in response to deflection of the elastically deflectable portion of the tubular means to indicate proximity of the trailer roof to an overhead obstruction.

11. A height clearance indicator comprising, a rigid tubular member having an upper end and a lower end, a laterally deflectable coil spring mounted on the upper end of the rigid tubular member, feeler means connected to the coil spring for lateral deflection thereof from a position axially aligned with the tubular member, said feeler means including a feeler rod projecting upwardly from an upper end portion of the coil spring, a cable secured to the upper end portion of the coil spring and extending downwardly therethrough, a guide fixedly mounted at the upper end of the rigid tubular member through which the cable extends, position indicating dial means connected to said cable for indicating engagement of the feeler rod in response to lateral deflection of the coil spring thereby, and adjustable positioning means operatively mounting the dial means on the lower end of the rigid tubular member.

No references cited.

LOUIS J. CAPOZI, *Primary Examiner.*